United States Patent
Myers et al.

(10) Patent No.: US 8,094,152 B1
(45) Date of Patent: *Jan. 10, 2012

(54) METHOD FOR DEPTH PEELING AND BLENDING

(75) Inventors: Kevin Myers, San Jose, CA (US); Louis Bavoil, London (GB); Mehmet Cem Cebenoyan, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1079 days.

This patent is subject to a terminal disclaimer.

(21) Appl. No.: 11/945,223

(22) Filed: Nov. 26, 2007

(51) Int. Cl.
*G06T 15/40* (2006.01)

(52) U.S. Cl. ........ 345/422; 345/419; 345/421; 345/426; 345/427; 345/501; 345/506; 345/581; 345/582; 345/592

(58) Field of Classification Search .................. 345/419, 345/420, 421, 422, 426, 427, 543, 501, 581, 345/582, 592, 506
See application file for complete search history.

(56) References Cited

U.S. PATENT DOCUMENTS

| | | | | |
|---|---|---|---|---|
| 7,385,608 B1 * | 6/2008 | Baldwin | ........................ | 345/506 |
| 7,505,036 B1 * | 3/2009 | Baldwin | ........................ | 345/421 |
| 2005/0225670 A1 * | 10/2005 | Wexler et al. | ................. | 348/441 |
| 2008/0316214 A1 * | 12/2008 | Peeper | ........................... | 345/501 |
| 2010/0188416 A1 * | 7/2010 | Hayes | ........................... | 345/592 |

OTHER PUBLICATIONS

Bavoil et al. "Multi-Fragment Effects on the GPU using the k-buffer", ACM, published Apr. 30 to May 2, 2007.*
Guha et al. "Application of the Two-sided Depth Test to CSG Rendering", ACM, 2003.*
Nienhaus et al. "illustrating Design and Spatial Assembly", ACM 2006.*
Mammen, et al. "Transparency and Antialiasing Algorithms Implemented with the Virtual Pixel Maps Technique", IEE Computer Graphics & Applications. Jul. 1989. pp. 43-55.
Cass Everitt. "Interactive Order-Independent Transparency", NVIDIA OpenGL Applications Engineering. May 15, 2001. 11pgs.

* cited by examiner

*Primary Examiner* — Kimbinh T Nguyen
(74) *Attorney, Agent, or Firm* — Patterson & Sheridan, LLP

(57) ABSTRACT

One embodiment of the present invention sets forth a technique for performing dual depth peeling, which is useful for order-independent transparency blending. Multiple rendering passes are performed on a graphics scene. After each rendering pass, the front-most and back-most layer of pixels are peeled away by computing a reference window. In subsequent rendering passes, only pixels within the reference window survive depth sorting. In each subsequent rendering pass, the reference window is narrowed by the front most and back most surviving pixels. By performing depth peeling in two directions simultaneously, the number of rendering passes needed to generate a completed graphics image is reduced from L to 1+L/2, which results in improved rendering performance.

20 Claims, 13 Drawing Sheets

METHOD FOR DEPTH PEELING AND BLENDING

BACKGROUND OF THE INVENTION

1. Field of the Invention

Embodiments of the present invention relate generally to computer graphics and more specifically to a method for depth peeling and blending.

2. Description of the Related Art

One function of modern computer graphics systems is rendering graphics images from a set of data representing three-dimensional (3D) objects. In addition to geometry information, each 3D object may also include attributes intended to produce certain desired effects within the rendered graphics image. The displayed color of a given pixel within a rendered graphics image includes the combined effect of all attributes applied to all 3D objects, such as geometric primitives or sets of geometric primitives, intersecting the pixel within the rendered graphics image. One attribute a geometric primitive may include is transparency. An overall transparency value may be applied to the entire geometric primitive, or a texture map may be used to specify the transparency of regions on the geometric primitive. Geometric primitives that are neither fully transparent nor fully opaque are said to be "semitransparent." Each pixel associated with a semitransparent geometric primitive may be semitransparent as well. As is well known, computing the displayed color of a semitransparent pixel involves blending the color of the pixel with the background color immediately behind the pixel, according to the degree of transparency of the semitransparent pixel.

When two or more semitransparent primitives are layered within a graphics image with respect to the view port of the graphics image, the blending order applied to the semitransparent geometric primitives must be consistently applied over all pixels on all semitransparent geometric primitives or incorrect results may be introduced. Such incorrect results may seriously diminish the overall visual quality of the graphics image.

One approach to preserving the blending order of pixels associated with semitransparent geometric primitives involves sorting the geometric primitives according to depth, relative to a specified view port, and rendering the geometric primitives in sorted order. As is well known, this approach only works in certain scenarios and produces incorrect results when semitransparent geometric primitives intersect. The intersection creates a situation where one geometric primitive is both in front of and behind the other geometric primitive, eliminating the possibility of a correct depth sorting order for the two geometric primitives.

A general, order-independent approach to rendering semi-transparent geometric primitives within a rendered image is known in the art as "depth peeling," which uses multiple passes of rendered graphics images to establish the blending order of semitransparent pixels on a per-pixel basis. In the first pass, a first color buffer and a first depth map are generated, such that only the pixel fragments that survive depth sorting are stored in the first color buffer and the first depth map stores the associated depth values. The color components (red, green and blue) and the transparency of each pixel fragment are stored in the first color buffer. In a second rendering pass, pixel fragments that are behind the corresponding first pass pixel fragments, but in front of any remaining pixel fragments, are stored in a second color buffer and corresponding depth values are stored in a second depth map. In each successive pass, a new color buffer is generated and stored, however, only two depth maps are necessary. One depth map is used for depth sorting and storing the results of the current pass, while the other depth map stores the results of the previous pass. In depth peeling, a pixel fragment survives depth sorting when the pixel fragment has a depth greater than the corresponding previously stored depth value, but is otherwise the closest pixel fragment among pixel fragments intersecting the same location within the rendered image. If the depth peeling operation performs N passes, then there are N color buffers that may be blended from back to front to establish a color buffer of pixels for display. While depth peeling generates correct transparency results, this approach requires N rendering passes and is therefore computationally expensive. The high computational expense of depth peeling diminishes overall system performance and may significantly diminish the frame rate of rendered graphics images available for display.

As the foregoing illustrates, what is needed in the art is a technique for performing efficient order-independent transparency rendering.

SUMMARY OF THE INVENTION

One embodiment of the present invention sets forth a method for performing depth peeling when rendering a graphics scene. The method includes the steps of performing a rendering operation across a plurality of geometric primitives in the graphics scene to produce a first set of pixels, where each pixel is associated with one of the geometric primitives and resides at a different depth within the graphics scene, performing a first depth test to produce a second set of pixels, where the depth of each pixel in the first set of pixels is compared to a first reference depth to determine whether the depth of the pixel is greater than or equal to the first reference depth, performing a second depth test for each pixel in the second set of pixels to produce a first surviving pixel, where the depth of each pixel in the second set of pixels is compared to a first active depth to determine whether the depth of the pixel is less than or equal to the first active depth, and storing the color of the first surviving pixel in a first color buffer and the depth of the first surviving pixel in a first depth buffer.

One advantage of the disclosed technique is that, by performing depth peeling in two directions simultaneously, the number of rendering passes needed to generate a completed graphics image is reduced from L to 1+L/2, which results in improved rendering performance.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
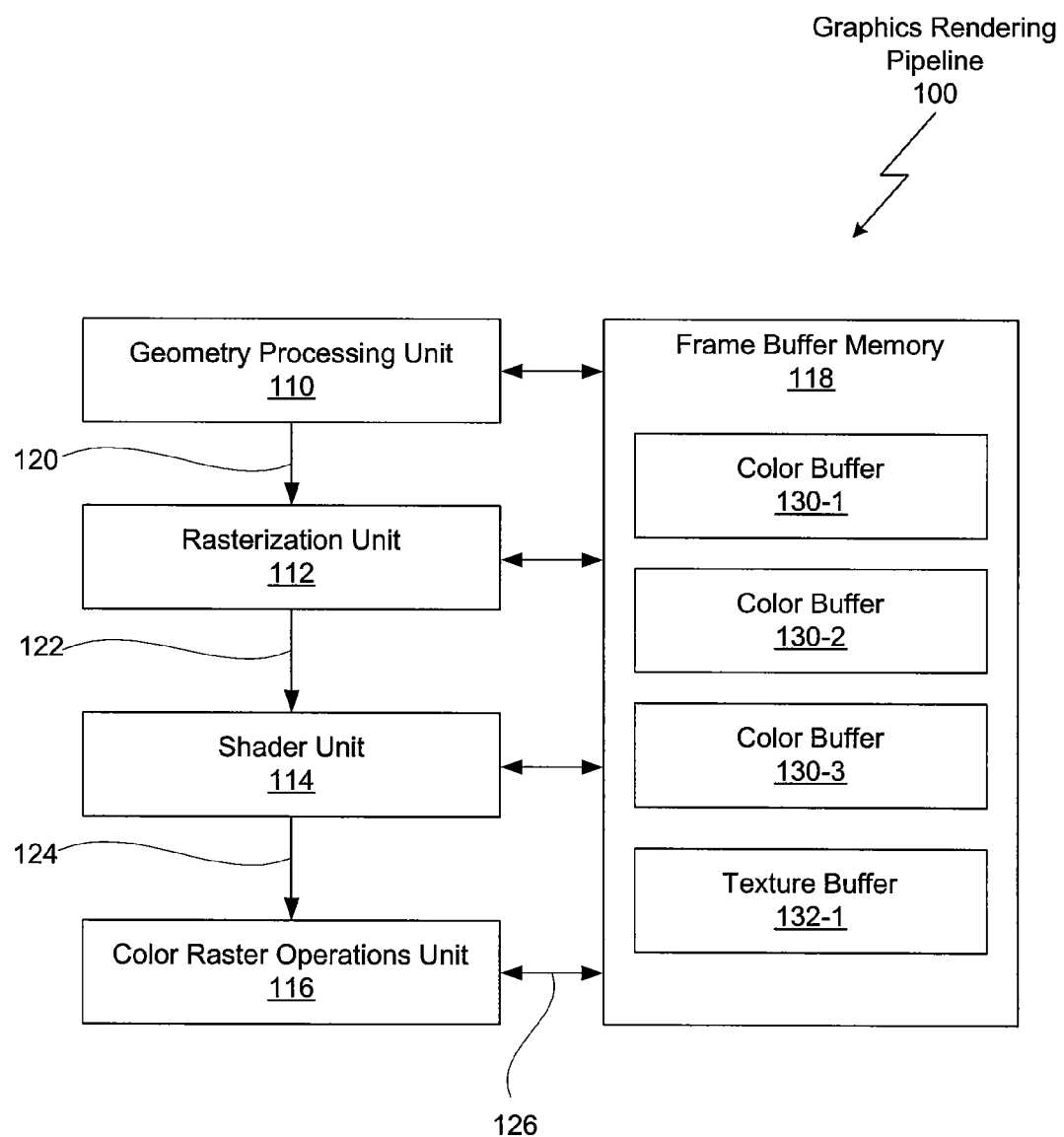
FIG. 1 is a conceptual diagram of a graphics rendering pipeline, according to one embodiment of the invention.

FIG. 1 is a conceptual diagram of a graphics rendering pipeline 100, according to one embodiment of the invention. The graphics rendering pipeline 100 includes, without limitation, a geometry processing unit 110, a rasterization unit 112, a shader unit 114, a color raster operations unit 116, and a frame buffer memory 118.

The geometry processing unit 110 receives geometric primitives, typically three-dimensional triangles, from a graphics application (not shown) and conducts geometric transforms as specified by the graphics application. The output of the geometry processing unit 110 includes geometric primitives 120, such as triangles, that are transformed and projected onto a two-dimensional surface, referred to as "screen space." Screen space represents a view port positioned within a three-dimensional graphics scene used for observing objects, such as geometric primitives, within the graphics scene. A two-dimensional surface in screen space may correspond to a region on a viewer's display screen used to display rendered images. Alternately, a two-dimensional surface in screen space may correspond to a destination rendering surface in applications that do not immediately display rendered frame buffer data to a screen. Such applications may render, for example, to a video clip that is stored before being viewed.

The geometric primitives 120 are distributed to one or more rasterization units 112. The rasterization unit 112 decomposes the geometric primitives 120 into pixel fragments 122, corresponding to screen space pixels that are least partially covered by the geometric primitives. In decomposing geometric primitives 120 into pixel fragments 122, the rasterization unit 112 determines the screen space pixel coverage of each geometric primitive along with the sample coverage of each fragment. Additionally, the rasterization unit 112 determines the screen space coverage and alignment of each geometric primitive 120. The output of the rasterization unit 112 includes, without limitation, pixel fragments 122 that include depth information.

The shader unit 114 receives fragments from the rasterization unit 112 and processes the fragments into shaded pixels 124, according to shading instructions specified by the graphics application. The shaded pixels 124 are transmitted to the color raster operations unit 116 for further processing. The color raster operations unit 116 performs any needed blending on the shaded pixels or samples, as specified by the graphics application, and generates pixel data 126 that is transmitted to the frame buffer memory 118 for storage and display.

The frame buffer memory 118 is typically built using synchronous dynamic random access memory (SDRAM), however, any type of suitable memory device may be used. The frame buffer memory 118 typically includes buffers with structured data, such as two-dimensional color buffers and texture maps. For example, color buffers 130-1 through 130-3 and texture buffer 132-1 represent two-dimensional surfaces used to store structured data.

Persons skilled in the art will recognize that the present invention is not limited in any way by the architecture of FIG. 1. In particular, the teachings of the present invention are equally applicable in graphics rendering pipelines having one or more geometry processing units, one or more rasterization units, one or more shader units, one or more raster operations units, one or more streaming multi-processors, or one or more frame buffers. For this reason, the remainder of the description may include references to particular elements of the graphics rendering pipeline in either singular or plural form without any intention to limit the scope of the present invention.

Figure 2A:
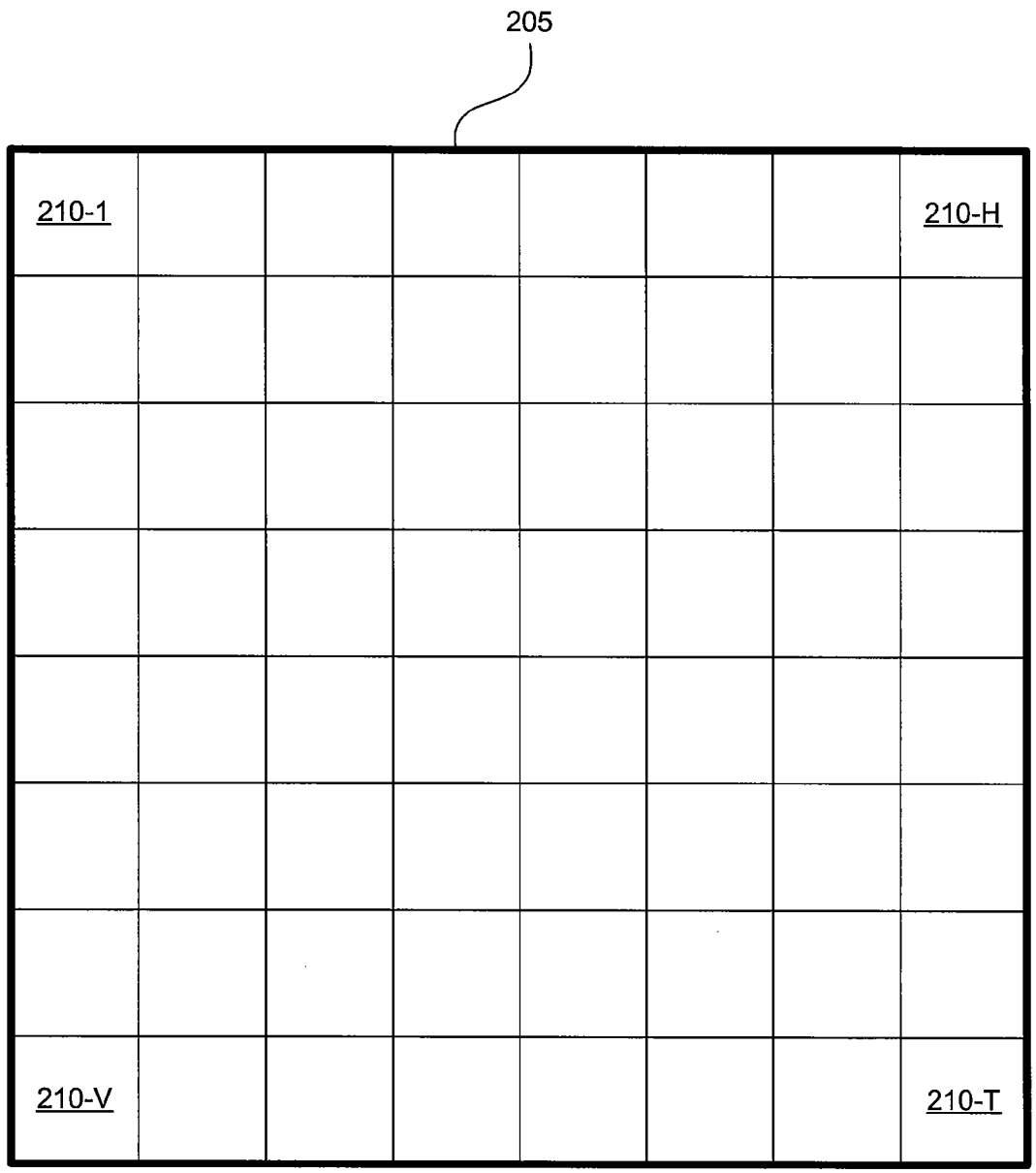
FIG. 2A represents a two-dimensional surface of data elements, according to one embodiment of the invention.

FIG. 2A represents a two-dimensional surface 205 of data elements 210, according to one embodiment of the invention. The two-dimensional surface 205 includes data elements 210 organized into V rows and H columns. Each data element 210 may include one or more components. For example, each element may represent a pixel with red, green and blue components. Each component may, for example, be an 8-bit unsigned integer, a 32-bit floating-point value, or any other useful data type.

Figure 2B:
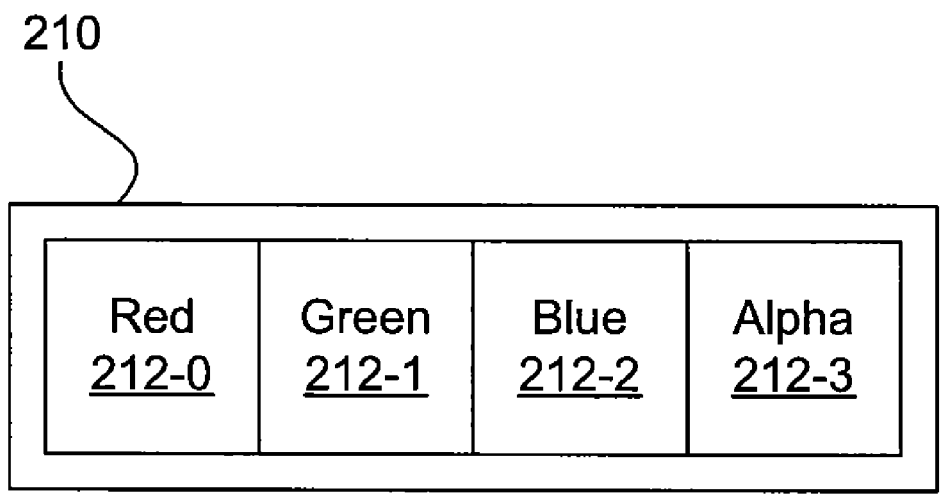
FIG. 2B represents a data element with four components, according to one embodiment of the invention.

FIG. 2B represents a data element 210 from FIG. 2A, with four components 212-0 through 212-3, according to one embodiment of the invention. Each component 212 is typically of an identical type. Two common component types are 8-bit unsigned integers and 32-bit floating-point values. In the case of an 8-bit unsigned integer, the data element 210 occupies four bytes. In the case of a 32-bit floating-point value, each floating-point component occupies four bytes, and the data element 210 occupies sixteen bytes.

Figure 2C:
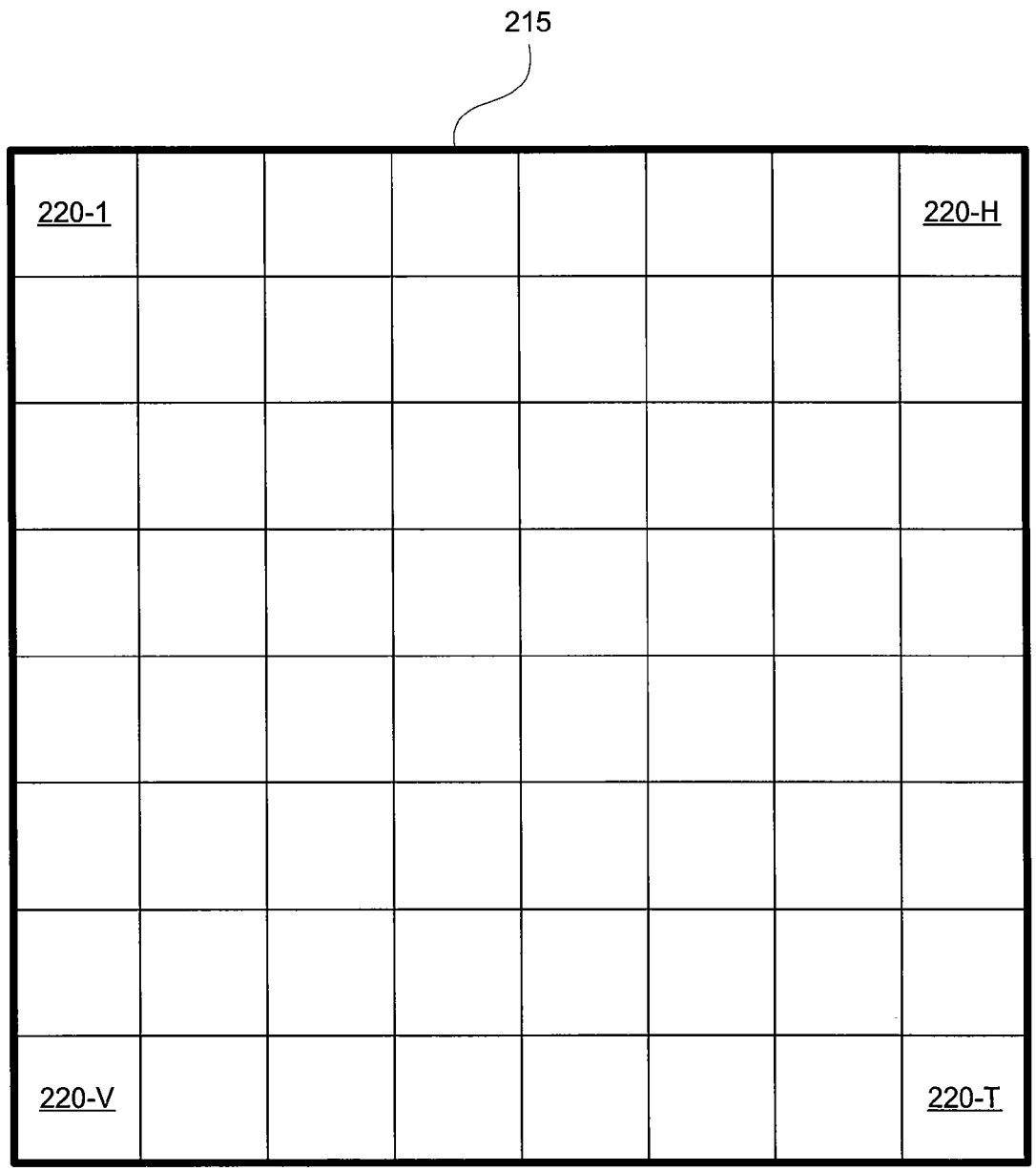
FIG. 2C represents a two-dimensional surface of data elements, according to one embodiment of the invention.

FIG. 2C represents a two-dimensional surface 215 of data elements 220, according to one embodiment of the invention. The two-dimensional surface 215 includes data elements 220 organized into V rows and H columns.

Figure 2D:
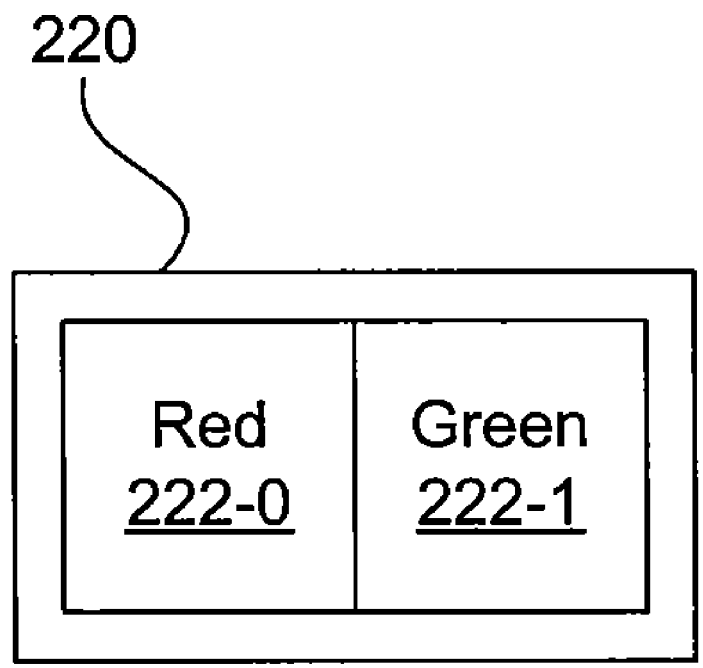
FIG. 2D represents a data element with two components, according to one embodiment of the invention.

FIG. 2D represents a data element 220 from FIG. 2C, with two components, according to one embodiment of the invention. In one embodiment, each component is configured to store a 32-bit floating-point value.

Figure 3A:
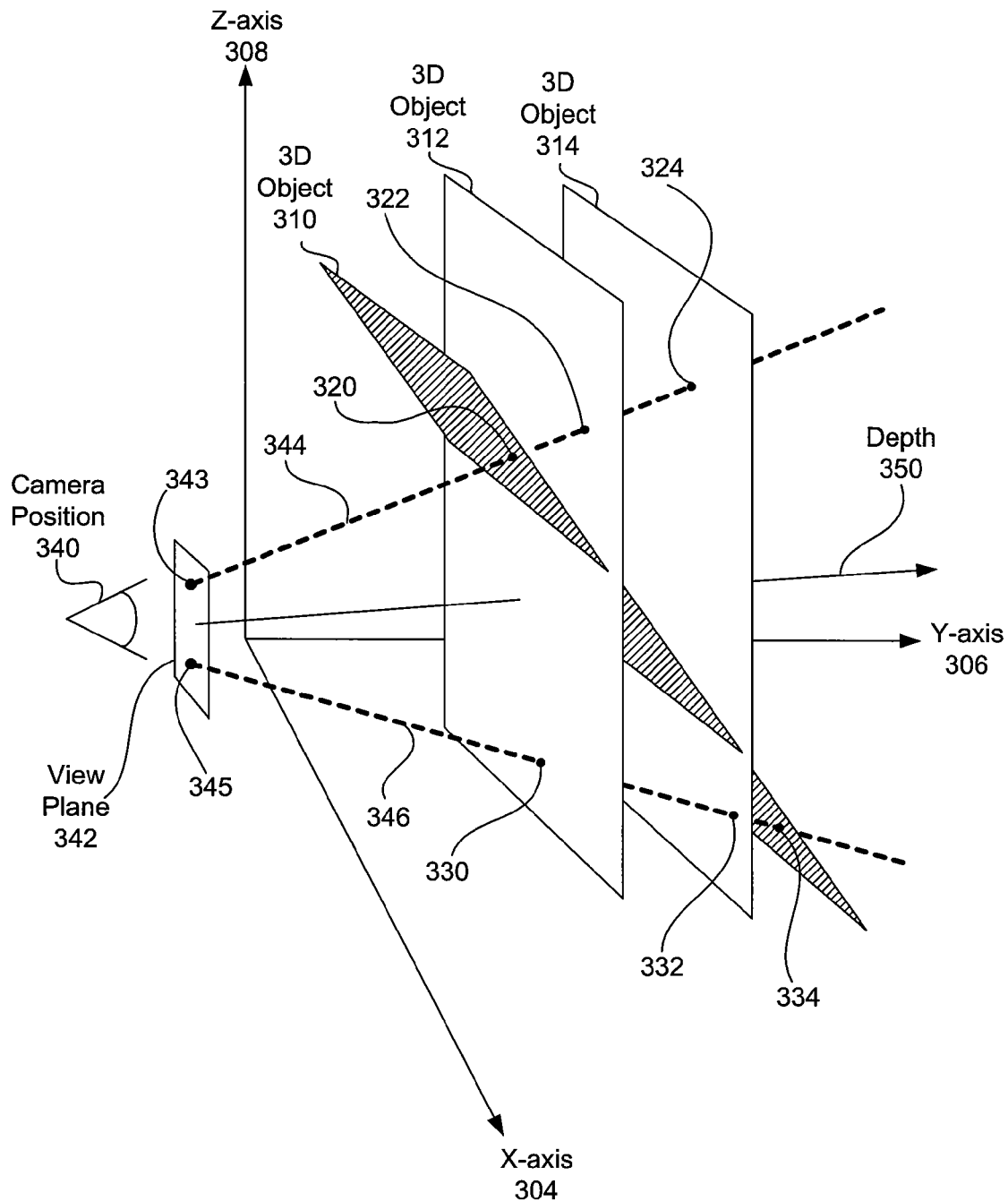
FIG. 3A illustrates a set of intersecting three-dimensional geometric primitives viewed from a camera position through a view plane, according to one embodiment of the invention.

FIG. 3A illustrates a set of intersecting three-dimensional geometric primitives 310, 312 and 314 viewed from a camera position 340 through a view plane 342, according to one embodiment of the invention. The three-dimensional geometric primitives 310, 312 and 324 are positioned relative to a three-dimensional axis, including an X-axis 304, a Y-axis 306 and a Z-axis 308.

The view plane 342 establishes an axis for depth 350 that represents distance into the scene from the view plane 342. The camera position 340, in conjunction with the view plane 342, establishes a set of pixels on the view plane that represent samples of the scene. For example, pixels 343 and 345 represent samples of the three-dimensional scene, as observed from the view plane. Each pixel 343 and 345 has an associated projection line 344 and 346, respectively, that projects depthwise into the scene. Each pixel projection line 344, 346 may intersect three-dimensional (3D) geometric primitives within the scene as the projection line extends to a maximum defined distance. For example, projection line 344 intersects 3D geometric primitive 310 at intersection point 320, 3D geometric primitive 312 at intersection point 322, and 3D geometric primitive 314 at intersection point 324. Similarly, projection line 346 intersects 3D geometric primitive 312 at intersection point 330, 3D geometric primitive 314 at intersection point 332, and 3D geometric primitive 310 at intersection point 334.

Persons skilled in the art will recognize that conventional geometric transformations may be performed on the 3D geometric primitives to project the 3D geometric primitives on the view plane 342. After such geometric projection transformations, each projection line 344, 346 corresponds to a screen space pixel position, and each 3D geometric primitive may cover certain pixels in a region of the two-dimensional view plane 342. Coverage of the projected 3D geometric primitives may be determined in two-dimensional space, while attributes such depth may be used for computing visibility of any corresponding screen space pixels.

Figure 3B:
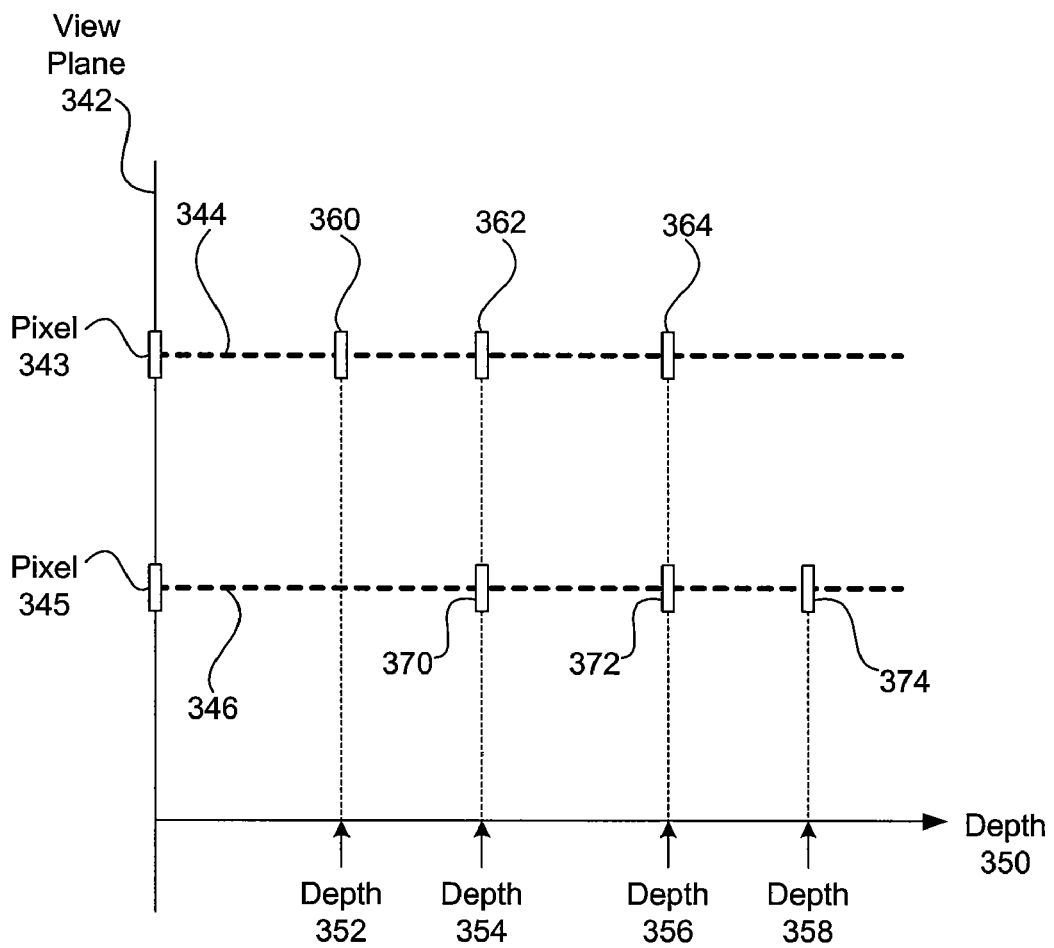
FIG. 3B illustrates two pixels on the view plane and a set of corresponding pixels intersecting covered geometric primitives, according to one embodiment of the invention.

FIG. 3B illustrates two pixels 343 and 345 on the view plane 342 and a set of corresponding pixels 360 through 374 intersecting covered geometric primitives, according to one embodiment of the invention. Each pixel 360, 362 and 364 corresponds to a different 3D geometric primitive covered by pixel 343 when projected onto the view plane. Each pixel 360, 362 and 364 includes associated depth value 352, 354, and 356, respectively. Similarly, each pixel 370, 372, and 374 corresponds to a different 3D geometric primitive covered by pixel 345. Each pixel 370, 372 and 374 includes an associated depth value 354, 356 and 358, respectively. In this example, pixel 360 corresponds to intersection point 320; pixel 362 corresponds to intersection point 322; and, pixel 364 corresponds to intersection point 324. Similarly, pixel 370 corresponds to intersection point 330, and so forth.

Figure 4A:
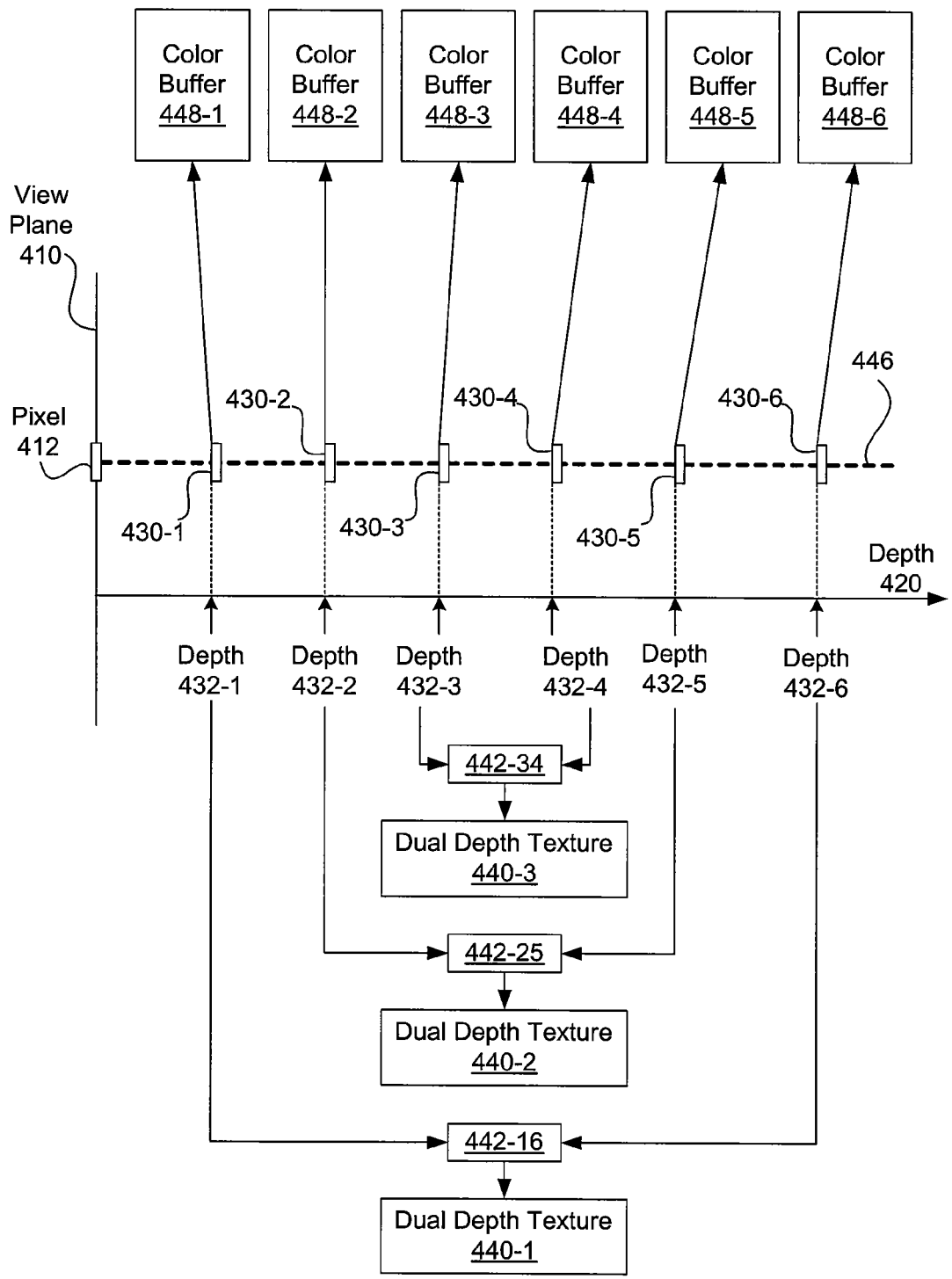
FIG. 4A illustrates data flow within a dual depth peeling algorithm, according to one embodiment of the invention.

FIG. 4A illustrates data flow within a dual depth peeling algorithm, according to one embodiment of the invention. The algorithm proceeds using multiple rendering passes of a graphics scene. Each rendering pass is performed over all geometric primitives within the scene using any technically appropriate rendering techniques to color the pixels within the scene. However, dual depth peeling diverges from conventional rendering in two ways. First, depth sorting is conducted using two dual depth texture buffers per pass rather than a single depth buffer. The first dual depth texture buffer stores two reference depth surfaces, while the second dual depth texture buffer stores pixel depth values for pixels surviving depth sorting in a current rendering pass. Second, color blending is modified from conventional geometric primitive order blending to sequential depth order blending. As is well known, depth order transparency blending properly represents multiple semitransparent layers.

As shown, view plane 410 includes a plurality of pixels, such as pixel 412. Pixel 412 is the final blended value of shaded pixels 430, each of which includes a specific depth 432 along a depth axis 420 and is computed where a particular 3D geometric primitive intersects pixel 412 along a screen space projection 446 along the depth axis 420. Color buffers 448 are two-dimensional surfaces, as illustrated in FIG. 2A, where each data element 210 may include four components 212, as shown in FIG. 2B. The color buffers 448 store pixels 430, computed in each rendering pass. After the rendering passes have completed, the color buffers 448 are blended using any technically feasible transparency blending technique to produce the final color values for the pixel 412 and the other pixels.

Each dual depth texture 440 is a two-dimensional surface, as illustrated in FIG. 2C, where each data element 220 includes two components, as shown in FIG. 2D. When used as a dual depth buffer for depth peeling, the first component 222-0 stores d1, where d1 ranges from 0.0 to 1.0. The second component 222-1 stores depth2 with the value "1.0-depth2," where depth2 ranges from 0.0 to 1.0, and 1.0-depth2 correspondingly ranges from 1.0 to 0.0. Persons skilled in the art will recognize that different data types, such as integers and floating-point numbers, may be used to represent depth in this context. In one embodiment, the components 222 are 32-bit floating-point type values.

In a given rendering pass, for a given set of pixels 430, four depth comparison operations are performed on the depth value of each pixel 430. The first depth comparison is performed relative to a corresponding near reference depth for the pixel 430, stored as a value in the first data element within a reference dual depth texture (not shown). A pixel survives this depth comparison for depth values larger than or equal to the near reference depth. The second depth comparison is performed relative to a corresponding near depth value stored in an active dual depth texture being used for the current rendering pass. A pixel survives this second depth comparison for pixel depth values smaller than or equal to the value stored in the active dual depth texture. The surviving pixel depth may be written to the first component of the corresponding data element of the active dual depth texture, replacing a larger, previously written pixel depth value. Pixels surviving the first depth comparison in a given rendering pass are subjected to the second depth comparison, with the smallest surviving pixel depth value for a given location ultimately remaining in the active dual depth texture at the end of the rendering pass.

The third depth comparison is performed relative to a corresponding far reference depth for the pixel 430, stored as a value in the second data element within the reference dual depth texture. A pixel survives this depth test for depth values smaller than or equal to the far reference depth. The fourth depth comparison is performed relative to a corresponding far depth value stored in the active dual depth texture. A pixel survives this fourth depth test for pixel depth values smaller than or equal to the value stored in the active dual depth texture. The surviving pixel depth may be written to the second component of the corresponding data element of the active dual depth texture, replacing a smaller, previously written depth pixel value. Pixels surviving the third depth comparison in a given rendering pass are subjected to the fourth depth comparison, with the smallest surviving pixel depth value for a given location ultimately remaining in the active dual depth texture at the end of the rendering pass. Importantly, values stored in the second component are written as 1.0-pixel_depth, where pixel_depth is the depth of the surviving pixel.

Persons skilled in the art will appreciate that storing the first and second data element components as "depth" and "1-depth" enables the use of the same compare and store operation on both data element components, while performing opposite comparison operations on each component. In one embodiment, for example, a blending mode referred to in the art as "MIN blending" is used to perform the second and fourth depth comparison operations over the first and second data element components, respectively.

Before the first rendering pass, the reference dual depth texture (not shown) and dual depth texture 440-1 are initialized. In the reference dual depth texture, each near reference depth is set to zero depth and each far reference depth is set to maximum depth. For example, in an exemplary system 0.0 represents zero depth relative to the view plane and 1.0 represents maximum depth from the view plane. Each data element within the dual depth texture 440-1 is initialized to the pair {1.0, (1.0-0.0)}. This pair sets the initial near active depth to maximum depth and far active depth to minimum depth in preparation for subsequent depth comparison operations. During the first rendering pass, dual depth texture 440-1 is designated as the active dual depth texture. After the first rendering pass, data element 442-16, within dual depth texture 440-1, includes a pair of values corresponding to depth 432-1 and one minus depth 432-6. In one embodiment, the first rendering pass is a special case, whereby the near reference depth and far reference depth values are assumed without the use of an initial reference dual depth texture.

Before the second rendering pass, dual depth texture 440-1 is designated to be the reference dual depth texture for the second pass. Also before the second rendering pass, dual depth texture 440-2 is designated to be the active dual depth texture for the second pass. During the second rendering pass, only those pixels with a depth greater than or equal to the near reference depth (depth 432-1) survive the first comparison operation. After surviving the first comparison operation, only those pixels with a depth less than or equal to the current depth of the corresponding depth value stored in active dual depth texture survive and are stored within the active dual depth texture. After the rendering pass is complete, a near depth representing the current peeled layer is stored within the active dual depth texture. In this example, depth 432-2 represents the near depth of pixel 412 after the second rendering pass.

During the second rendering pass, only those pixels with a depth less than or equal to the far reference depth (depth 432-6) survive the third comparison operation. After surviving the third comparison operation, only those pixels with a depth greater than or equal to the current depth of the corresponding depth value stored in active dual depth texture survive and are stored within the active dual depth texture. After the rendering pass is complete, a far depth representing the current peeled layer is stored within the active dual depth texture. In this example, depth 432-5 represents the far depth of pixel 412 after the second rendering pass.

After the second rendering pass, data element 442-25, within dual depth texture 440-2, includes a pair of values corresponding to depth 432-2 and one minus depth 432-5. Importantly, this outcome is independent of the order in which the pixels 430 are rendered.

The third rendering pass follows the process described above, such that after the third rendering pass, data element 442-34, within dual depth texture 440-3, includes a pair of values corresponding to depth 432-3 and one minus depth 432-4.

In one embodiment, pairs of color buffers 448 store rendered results of each rendering pass corresponding to the shaded colors for each surviving pixel. For example, color buffers 448-1 and 448-6 store the color and transparency ("alpha") of the nearest and farthest pixels after the first rendering pass. Similarly, color buffers 448-2 and 448-5 store the color and transparency of the second nearest and second farthest pixels after the second rendering pass, and color buffers 448-3 and 448-4 store the color and transparency of the third nearest and third farthest pixels.

In the first rendering pass, pixel 430-1 is written to the corresponding location in color buffer 448-1 because depth 432-1 is the closest in depth to the view plane 410. Additionally, pixel 432-6 is written to the corresponding location in color buffer 448-6 because depth 432-6 is the farthest in depth from the view plane 410.

After the final rendering pass is completed, color buffers 448 store color and transparency data for each successive transparency layer on a per pixel basis. To compute the final color value of pixel 412, the color buffers are blended in consistent order (for example, back-to-front) using any technically feasible transparency blending technique. Each pixel associated with the view plane 410 is similarly computed.

Figure 4B:
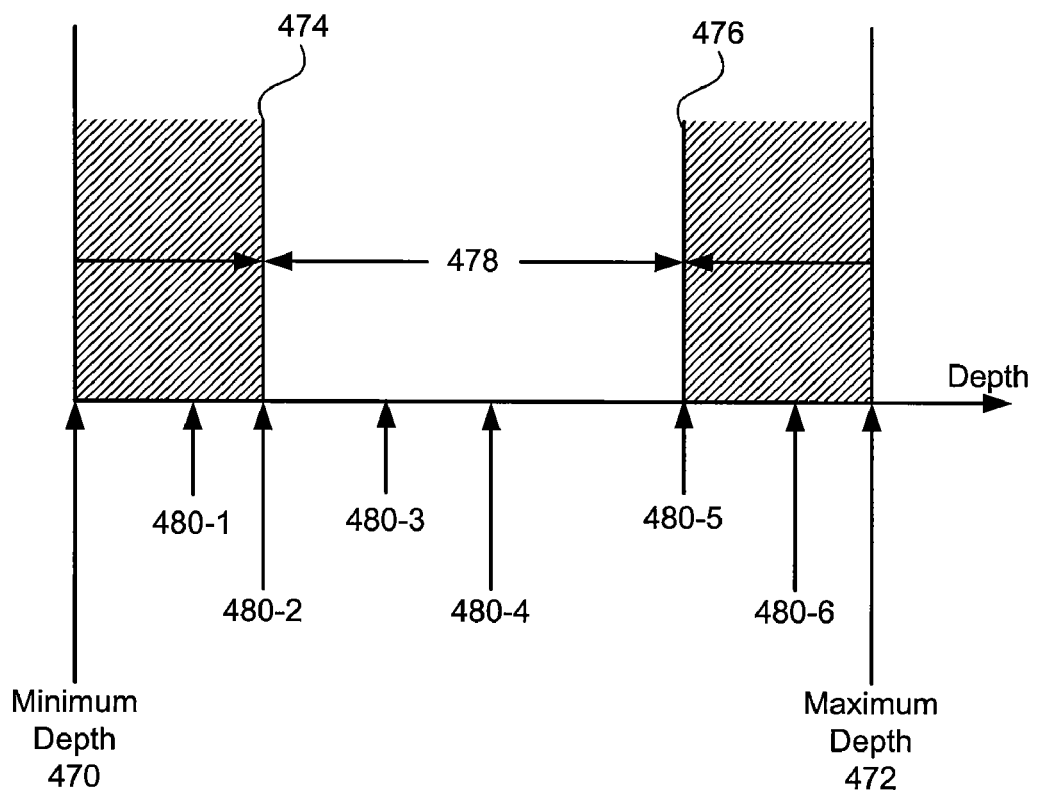
FIG. 4B illustrates a reference depth window used for depth sorting, according to one embodiment of the invention.

FIG. 4B illustrates a reference depth window 478 used for depth sorting, according to one embodiment of the invention. The reference depth window 478 is defined by a near reference depth 474 and a far reference depth 476. In one embodiment, near reference depth 474 and far reference depth 476 correspond to the first component 222-0 and second component 222-1 of data element 220 shown in of FIG. 2D. Importantly, each pixel has a corresponding reference depth window 478. Each possible depth ranges in value from a minimum depth 470 to a maximum depth 472. In one embodiment the minimum depth 470 is defined to be a 32-bit floating-point value of 0.0, while the maximum depth 472 is defined to be a 32-bit floating point value of 1.0. In alternate embodiments different floating point representations may be used, or integer values may be used to represent depth without diverging from the teachings set forth herein.

In this example, six depth values 480 are associated with six pixels covered by one screen space pixel. The state of the reference window 478 after a second rendering pass is shown. In a first rendering pass, depth value 480-1 establishes a near reference depth and depth value 480-6 establishes a far reference depth. During the second rendering pass, depth value 480-2 establishes a new near reference depth value 474, which is the closest depth value to the minimum depth 470 but is also larger than depth value 480-1. Additionally, depth value 480-5 establishes a new far reference depth 476, which is the farthest depth value from the minimum depth 470 but is also the closer than depth value 480-6. In each successive rendering pass, the reference window 478 may close further as additional depth values are encountered during rendering.

Figure 5:
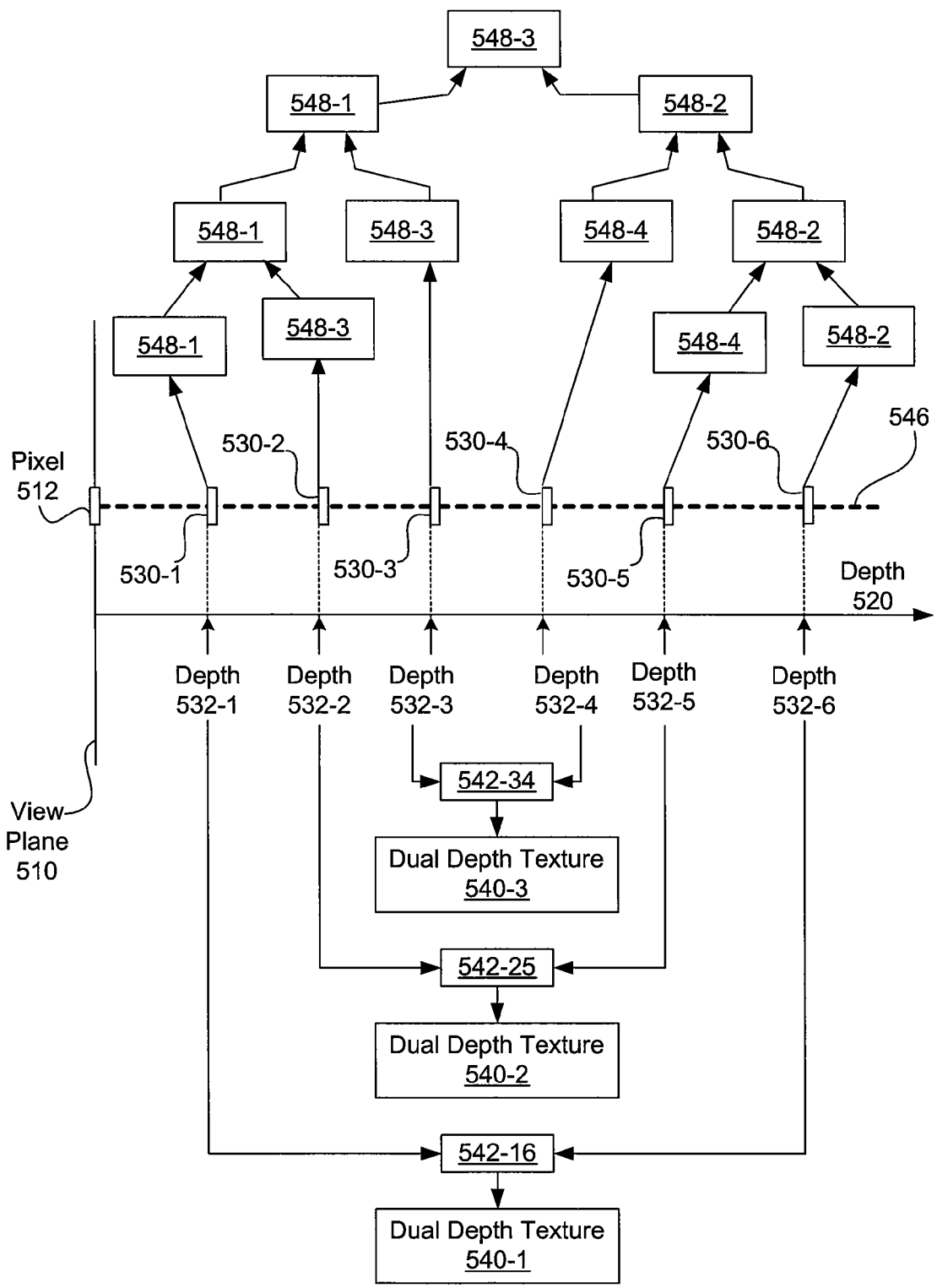
FIG. 5 illustrates data flow within a dual depth peeling algorithm, according to a second embodiment of the invention.

FIG. 5 illustrates data flow within a dual depth peeling algorithm, according to a second embodiment of the invention. This second embodiment follows the depth comparison teachings of FIG. 4 related to sorting depth values 532, associated with pixels 530, into data elements 542 for storage in dual depth textures 540. Each pixel 530 is covered by screen space pixel 512 on view plane 510. An intersection line 546 projected from the pixel 512 along the depth axis 520 indicates the coverage of a screen space pixel with 3D geometric primitives within a graphics scene.

In this second embodiment, color buffers 548 are blended together during each rendering pass. By contrast, two color buffers 448 in FIG. 4A are stored for each rendering pass until the rendering passes are completed before the color buffers 448 are blended together. In this example, three rendering passes are made, followed by a final blending pass.

Four color buffers 548-1 through 548-4 are initialized prior to rendering. Color buffers 548-1 and 548-2 are used as rendering targets. After the first rending pass, color buffer 548-1 stores color and transparency information for each pixel that is closest to the view plane 510. Similarly, color buffer 548-2 stores transparency information for each pixel that is farthest from the view plane 510.

During the second rendering pass, color buffers 548-3 and 548-4 are used as rendering targets. After the second rending pass, color buffer 548-3 stores color and transparency information for each pixel that is second closest to the view plane 510. Similarly, color buffer 548-4 stores transparency information for each pixel that is second farthest from the view plane 510. After the second rendering pass color buffers 548-1 and 548-3 are blended together in color buffer 548-1. Similarly, color buffers 548-2 and 548-4 are blended together in color buffer 548-2.

During the third rendering pass, color buffers 548-3 and 548-4 are used as the render targets. After the third rendering pass, color buffer 548-3 stores color and transparency information for each pixel that is third closest to the view plane 510. Similarly, color buffer 548-4 stores transparency information for each pixel that is third farthest from the view plane 510. After the third rendering pass, color buffers 548-1 and 548-3 are blended together in color buffer 548-1. Similarly, color buffers 548-2 and 548-4 are blended together in color buffer 548-2. After the final rendering pass, color buffers 548-1 and 548-2 are blended together in a final color buffer, for example color buffer 548-3. Persons skilled in the art will recognize that only four color buffers are needed to perform the required blending operations and that the specific buffer scheduling described herein is for illustrative purposes only. In fact, any technically feasible buffer scheduling scheme may be used.

The number of rendering passes required by this technique is $1+L/2$, where L is the number of separate transparency layers in the graphics scene that need a rendering pass.

Figure 6:
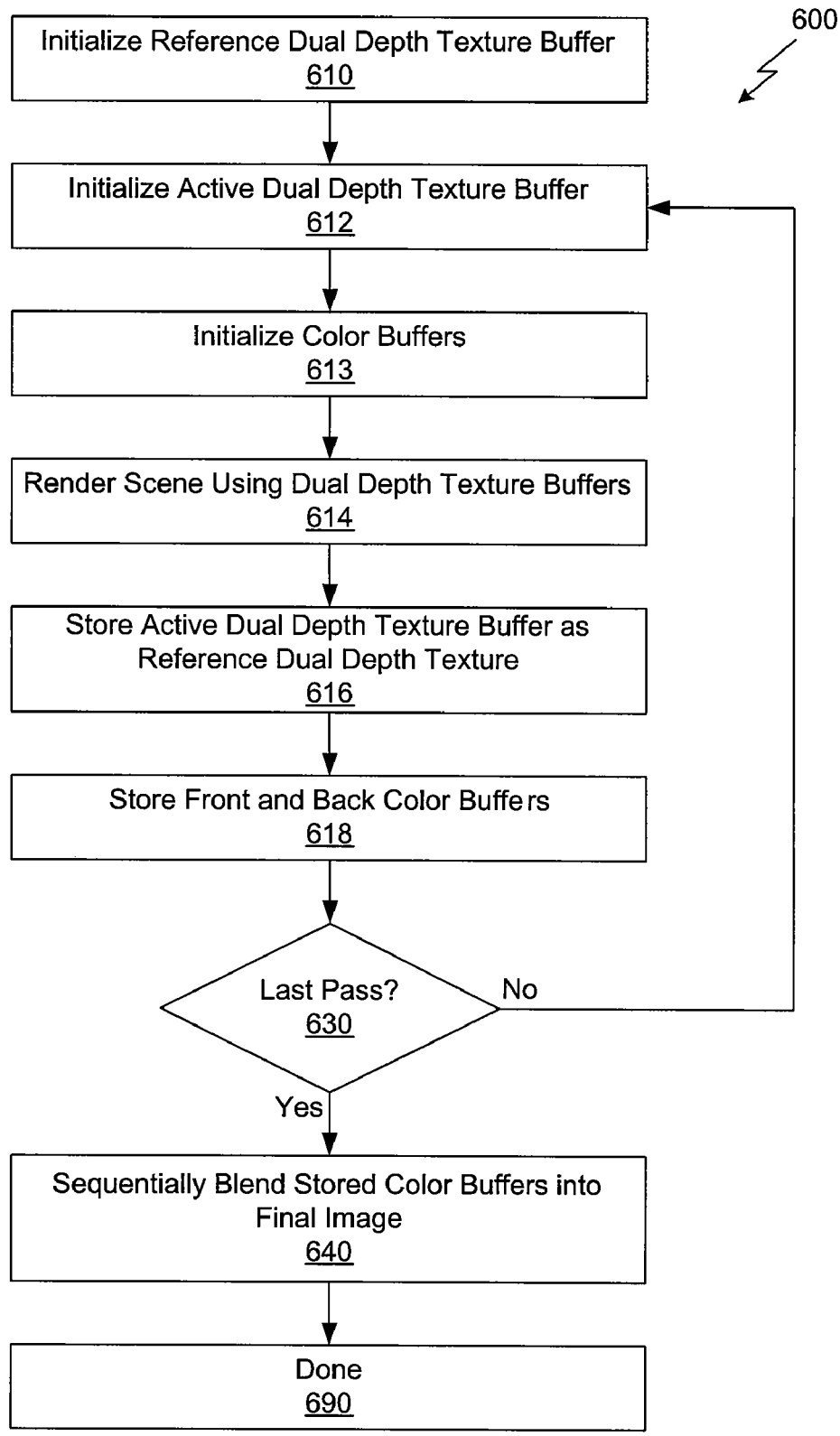
FIG. 6 is a flow diagram of method steps for performing depth peeling, according to one embodiment of the invention.

FIG. 6 is a flow diagram of method steps 600 for performing depth peeling, according to one embodiment of the invention. Although the method steps are described in conjunction with the systems of FIGS. 1 and 8, persons skilled in the art will understand that any system that performs the method steps, in any order, is within the scope of the invention.

The method begins is step 610, where the graphics rendering pipeline initializes a reference dual depth texture buffer. In step 612 the graphics pipeline initializes an active dual depth texture buffer. In step 613, the graphics rendering pipeline initializes two new color buffers. The initialization process may involve allocating the color buffers prior to each rendering pass. In one embodiment the color buffers are initialized with transparent black. The first color buffer is designated as a front color buffer and the second color buffer is designated as a back color buffer.

In step 614, the graphics rendering pipeline renders a scene using the two color buffers as render targets and the two dual depth texture buffers for depth sorting, whereby the first dual texture buffer establishes a reference window and the second dual texture buffer is used as the active dual texture buffer for the current rendering pass. Furthermore, the front color buffer is used to store pixels that survive depth comparison against the near reference depth, and the back color buffer is used to store pixels that survive depth comparison against the far reference depth. In step 616, the graphics rendering pipeline stores the active dual depth texture buffer as the new reference dual depth texture. This step may involve copying the underlying dual texture buffer or simply designating the underlying buffer as the new reference dual depth texture. In step 618, the graphics rendering pipeline stores the front color buffer and the back color buffer.

If, in step 630, the current rendering pass is the last rendering pass, then the method proceeds to step 640, where the previously stored color buffers are sequentially blended together to generate a final image. In one embodiment, the sequential blending order is from back to front. The method terminates in step 690.

Returning to step 630, if the current rendering pass is not the last rendering pass, then the method proceeds to step 612.

Any technically feasible technique may be used to determine which rendering pass is the last rendering pass.

Figure 7:
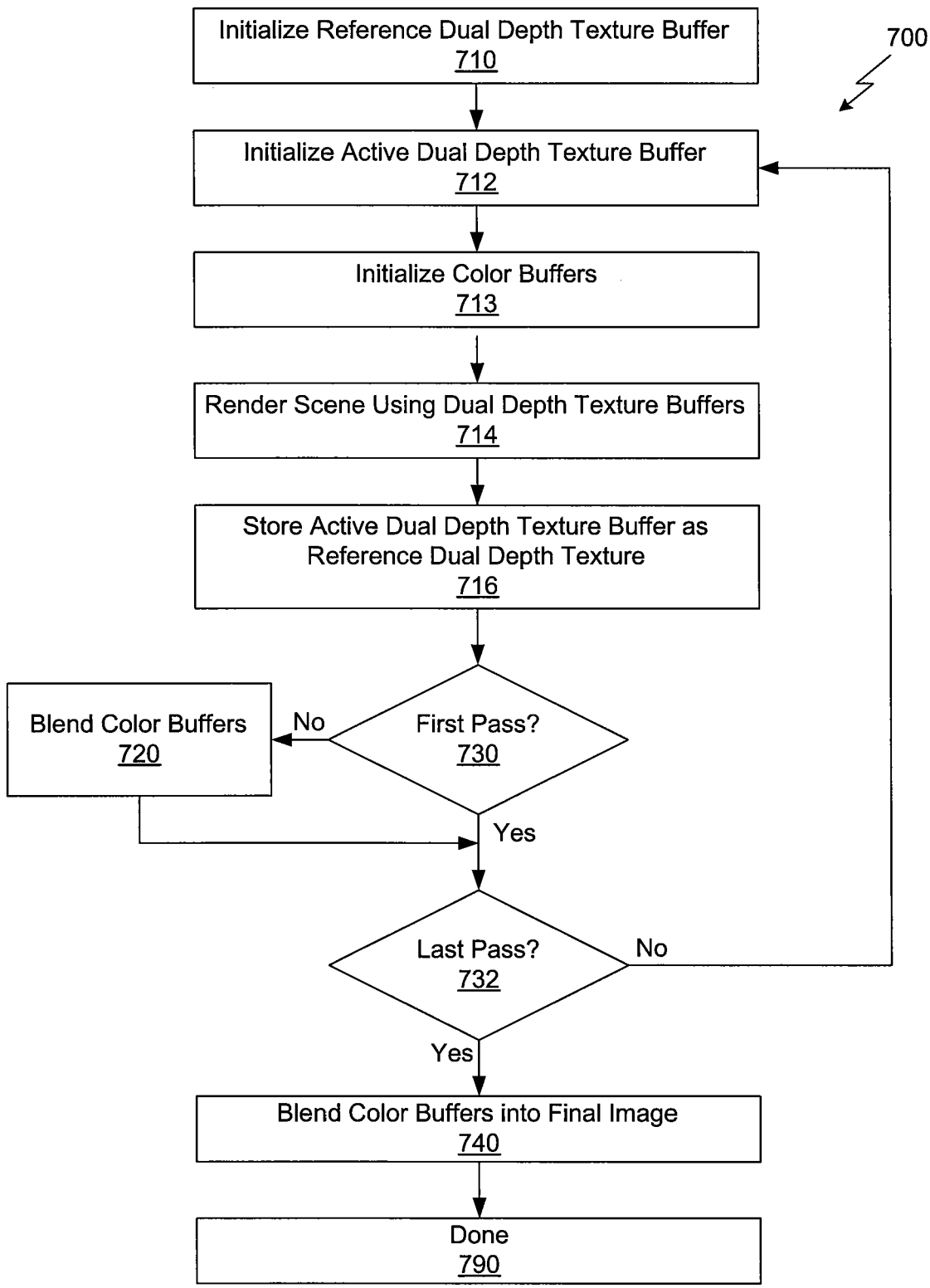
FIG. 7 is a flow diagram of method steps for performing depth peeling, according to a second embodiment of the invention.

FIG. 7 is a flow diagram of method steps 700 for performing depth peeling, according to a second embodiment of the invention. Although the method steps are described in conjunction with the systems of FIGS. 1 and 8, persons skilled in the art will understand that any system that performs the method steps, in any order, is within the scope of the invention.

The method begins is step 710, where the graphics rendering pipeline initializes a reference dual depth texture buffer. In step 712, the graphics pipeline initializes an active dual depth texture buffer. In step 713, the graphics rendering pipeline initializes four new color buffers. The initialization process may involve allocating the four color buffers once. In one embodiment the color buffers are initialized with transparent black. The first and third color buffers are designated as front color buffers and the second and fourth color buffers are designated as back color buffers.

In step 714, the graphics rendering pipeline renders a scene using the two color buffers as render targets and the two dual depth texture buffers for depth sorting, whereby the first dual texture buffer establishes a reference window and the second dual texture buffer is used as the active dual texture buffer for the current rendering pass. Furthermore, the front color buffer is used to store pixels that survive depth comparison against the near reference depth, and the back color buffer is used to store pixels that survive depth comparison against the far reference depth. In step 716, the graphics rendering pipeline stores the active dual depth texture buffer as the new reference dual depth texture. This step may involve copying the underlying dual texture buffer or simply designating the underlying buffer as the new reference dual depth texture.

If, in step 730, the current rendering pass is not the first rendering pass, then the method proceeds to step 720, where the third color buffer is blended into the first color buffer and the fourth color buffer is blended into the second color buffer. If, in step 732, the current rendering pass is the last rendering pass, then the method proceeds to step 740, where first and second color buffers are blended together to generate a completed graphics image frame. The color buffers may be blended using any technically feasible transparency blending technique. The method terminates in step 790.

Returning to step 730, if the current rendering pass is the first rendering pass, then the method proceeds to step 732. If, in step 732 the current rendering pass is not the last rendering pass, then the method proceeds to step 712.

Figure 8:
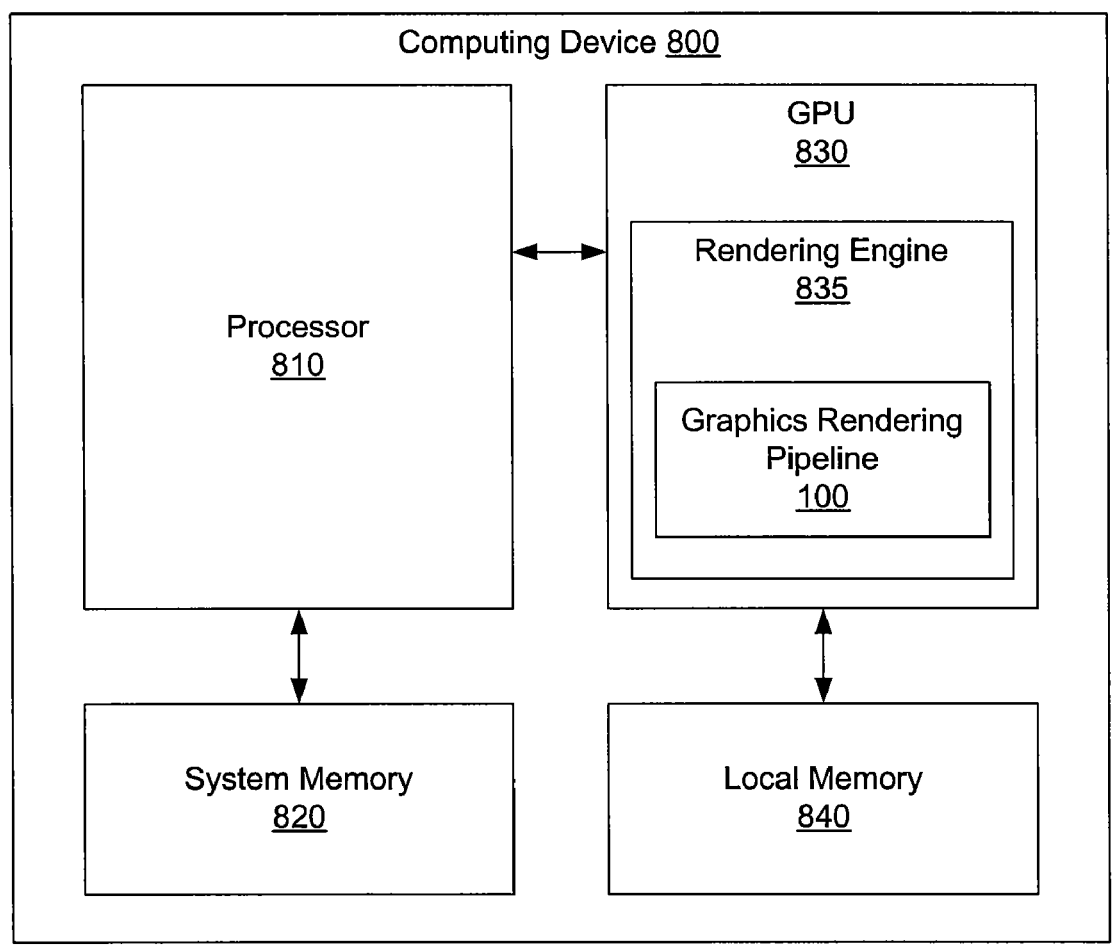
FIG. 8 is a conceptual diagram of a computing device configured to implement one or more aspects of the present invention.

FIG. 8 is a conceptual diagram of a computing device 800 configured to implement one or more aspects of the present invention. The computing device 800 includes, without limitation, a processor 810, system memory 820, a graphics processing unit (GPU) 830 and local memory 840 coupled to the GPU 830. The GPU 830 includes at least one rendering engine 835 that, in turn, includes at least one graphics rendering pipeline 100 used to process data, as described above. In alternate embodiments, the processor 810, GPU 830, local memory 840, system memory 820, or any combination thereof, may be integrated into a single processing unit. Furthermore, the functionality of GPU 830 may be included in a chipset or in some other type of special purpose processing unit or co-processor. Persons skilled in the art will recognize that any system having one or more processing units configured to implement the teachings disclosed herein falls within the scope of the present invention. Thus, the architecture of computing device 800 in no way limits the scope of the present invention.

In sum, a technique for performing dual depth peeling is disclosed, which is useful for order-independent transparency blending. Multiple rendering passes are performed on a graphics scene.

After each rendering pass, the front-most and back-most layer of pixels are peeled away by computing a reference window. In subsequent rendering passes, only pixels within the reference window survive depth sorting. In each subsequent rendering pass, the reference window is narrowed by the front most and back most surviving pixels. A reference dual depth texture stores the near reference depth and the far reference depth that define the reference window for each pixel. An active dual depth texture map stores in-progress depth sorting results. By performing depth peeling in two directions simultaneously, the number of rendering passes needed to generate a completed graphics image is reduced from L to 1+L/2, which results in improved rendering performance.

In one embodiment, color buffers collect the pixel color and transparency of the front most and back most layer in each rendering pass. After the last rendering pass, the color buffers are blended together to generate a completed graphics image, where each successive color buffer includes pixels in successive depth sorted order.

In a second embodiment, four color buffers are used, with two color buffers accumulating color and transparency as layers are peeled from front to back, and two color buffers accumulating color and transparency as layers are peeled from back to front. Two color buffers store previous results, while two color buffers are used to store color and transparency results within a rendering pass.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for performing depth peeling when rendering a graphics scene, the method comprising:

performing a rendering operation across a plurality of geometric primitives in the graphics scene to produce a first set of pixels, wherein each pixel is associated with one of the geometric primitives and resides at a different depth within the graphics scene;

performing a first depth test to produce a second set of pixels, wherein the depth of each pixel in the first set of pixels is compared to a first reference depth to determine whether the depth of the pixel is greater than or equal to that of the first reference depth;

performing a second depth test for each pixel in the second set of pixels to produce a first surviving pixel, wherein the depth of each pixel in the second set of pixels is compared to a first active depth to determine whether the depth of the pixel is less than or equal to the first active depth; and storing the first surviving pixel in a first color buffer.

2. The method of claim 1, further comprising the steps of:

performing a third depth test to produce a third set of pixels, wherein the depth of each pixel in the first set of pixels is compared to a second reference depth to determine whether the depth of the pixel is less than or equal to that of the second reference depth;

performing a fourth depth test for each pixel in the third set of pixels to produce a second surviving pixel, wherein the depth of each pixel in the third set of pixels is compared to a second active depth to determine whether the depth of the pixel is greater than or equal to that of the second active depth; and storing the second surviving pixel in a second color buffer.

3. The method of claim 2, further comprising the step of blending the first surviving pixel in the first color buffer with the second surviving pixel in the second color buffer.

4. The method of claim 3, wherein the steps of performing the first depth test, performing the second depth test, storing the surviving pixel from the second depth test in a unique color buffer, performing the third depth test, performing the fourth depth test, storing the surviving pixel from the fourth depth test in another unique color buffer, and blending the surviving pixels in the unique color buffers are repeated for a plurality of rendering operations, wherein each rendering operation generates a set of pixels, and the first active depth and the second active depth are initialized prior to each rendering operation.

5. The method of claim 2, wherein the second depth test is performed one pixel at a time, and further comprising the step of updating the first active depth with the depth of a pixel in the second set of pixels if the depth of the pixel is less than or equal to the first active depth.

6. The method of claim 5, wherein the fourth depth test is performed one pixel at a time, and further comprising the step of updating the second active depth with the depth of a pixel in the third set of pixels if the depth of the pixel is greater than or equal to the second active depth.

7. The method of claim 6, wherein the first reference depth and the second reference depth are stored as part of a texture in a reference dual-depth texture buffer, and the first active depth and the second active depth are stored as part of a texture in an active dual-depth texture buffer.

8. The method of claim 7, further comprising the step of storing the first active depth and the second active depth as part of the texture in the reference dual-depth texture buffer to create a new first reference depth and a new second reference depth for a next rendering operation.

9. The method of claim 7, wherein the texture in the reference dual-depth texture buffer and the texture in the active dual-depth texture buffer are two-dimensional surfaces having data elements that each include two components.

10. A non-transitory computer-readable medium including instructions that, when executed by a processing unit, cause the processing unit to perform depth peeling when rendering a graphics scene, by performing the steps of:

performing a rendering operation across a plurality of geometric primitives in the graphics scene to produce a first set of pixels, wherein each pixel is associated with one of the geometric primitives and resides at a different depth within the graphics scene;

performing a first depth test to produce a second set of pixels, wherein the depth of each pixel in the first set of pixels is compared to a first reference depth to determine whether the depth of the pixel is greater than or equal to that of the first reference depth;

performing a second depth test for each pixel in the second set of pixels to produce a first surviving pixel, wherein the depth of each pixel in the second set of pixels is compared to a first active depth to determine whether the depth of the pixel is less than or equal to the first active depth; and storing the first surviving pixel in a first color buffer.

11. The non-transitory computer-readable medium of claim 10, further comprising the steps of:

performing a third depth test to produce a third set of pixels, wherein the depth of each pixel in the first set of pixels is compared to a second reference depth to determine whether the depth of the pixel is less than or equal to that of the second reference depth;

performing a fourth depth test for each pixel in the third set of pixels to produce a second surviving pixel, wherein the depth of each pixel in the third set of pixels is compared to a second active depth to determine whether the depth of the pixel is greater than or equal to the second active depth; and storing the second surviving pixel in a second color buffer.

12. The non-transitory computer-readable medium of claim 11, further comprising the step of blending the first surviving pixel in the first color buffer with the second surviving pixel in the second color buffer.

13. The non-transitory computer-readable medium of claim 12, wherein the steps of performing the first depth test, performing the second depth test, storing the surviving pixel from the second depth test in a unique color buffer, performing the third depth test, performing the fourth depth test, storing the surviving pixel from the fourth depth test in another unique color buffer, and blending the surviving pixels in the unique color buffers are repeated for a plurality of rendering operations, wherein each rendering operation generates a set of pixels, and the first active depth and the second active depth are initialized prior to each rendering operation.

14. The non-transitory computer-readable medium of claim 11, wherein the second depth test is performed one pixel at a time, and further comprising the step of updating the first active depth with the depth of a pixel in the second set of pixels if the depth of the pixel is less than or equal to the first active depth.

15. The non-transitory computer-readable medium of claim 14, wherein the fourth depth test is performed one pixel at a time, and further comprising the step of updating the second active depth with the depth of a pixel in the third set of pixels if the depth of the pixel is greater than or equal to the second active depth.

16. The non-transitory computer-readable medium of claim 15, wherein the first reference depth and the second reference depth are stored as part of a texture in a reference dual-depth texture buffer, and the first active depth and the second active depth are stored as part of a texture in an active dual-depth texture buffer.

17. The non-transitory computer-readable medium of claim 16, further comprising the step of storing the first active depth and the second active depth as part of the texture in the reference dual-depth texture buffer to create a new first reference depth and a new second reference depth for a next rendering operation.

18. The non-transitory computer-readable medium of claim 16, wherein the texture in the reference dual-depth texture buffer and the texture in the active dual-depth texture buffer are two-dimensional surfaces having data elements that each include two components.

19. A computing device configured to perform depth peeling when rendering a graphics scene, the computing device comprising:

a processing unit that includes a graphics rendering pipeline; and a memory coupled to the processing unit and configured to store a reference dual-depth texture and an active dual-depth texture, wherein the graphics rendering pipeline is configured to:

perform a rendering operation across a plurality of geometric primitives in the graphics scene to produce a first set of pixels, wherein each pixel is associated with one of the geometric primitives and resides at a different depth within the graphics scene, perform a first depth test to produce a second set of pixels, wherein the depth of each pixel in the first set of pixels is compared to a first reference depth in the reference dual-depth texture to determine whether the depth of the pixel is greater than or equal to that of the first reference depth, perform a second depth test for each pixel in the second set of pixels to produce a first surviving pixel, wherein the depth of each pixel in the second set of pixels is compared to a first active depth in the active dual-depth texture to determine whether the depth of the pixel is less than or equal to the first active depth, store the first surviving pixel in a first color buffer, perform a third depth test to produce a third set of pixels, wherein the depth of each pixel in the first set of pixels is compared to a second reference depth in the reference dual-depth texture to determine whether the depth of the pixel is less than or equal to that of the second reference depth, perform a fourth depth test for each pixel in the third set of pixels to produce a second surviving pixel, wherein the depth of each pixel in the third set of pixels is compared to a second active depth in the active dual-depth texture to determine whether the depth of the pixel is greater than or equal to the second active depth, and store the second surviving pixel in a second color buffer.

20. The computing system of claim 19, wherein the graphics rendering pipeline is further configured to blend the first surviving pixel in the first color buffer and the second surviving pixel in the second color buffer.

* * * * *